Feb. 22, 1955 R. T. KEENE 2,702,532
EXHAUST VALVE COOLING SYSTEM
Filed Aug. 26, 1950 4 Sheets-Sheet 1
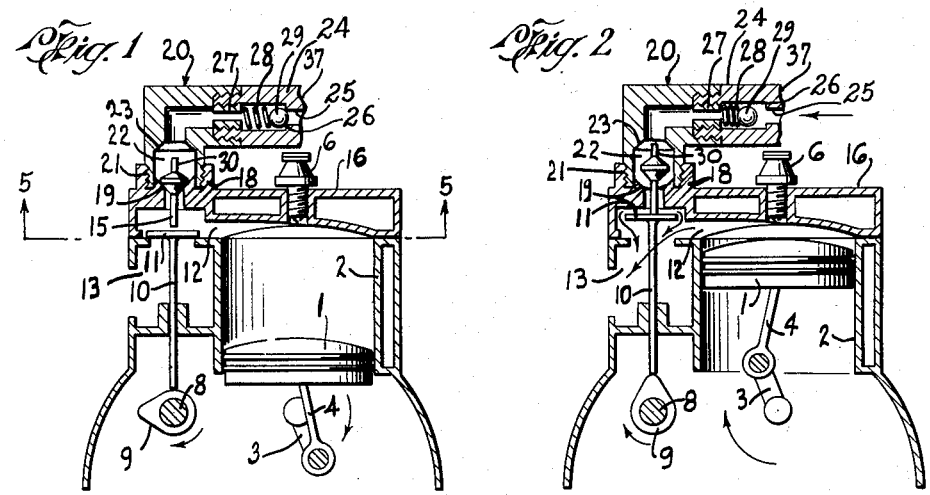
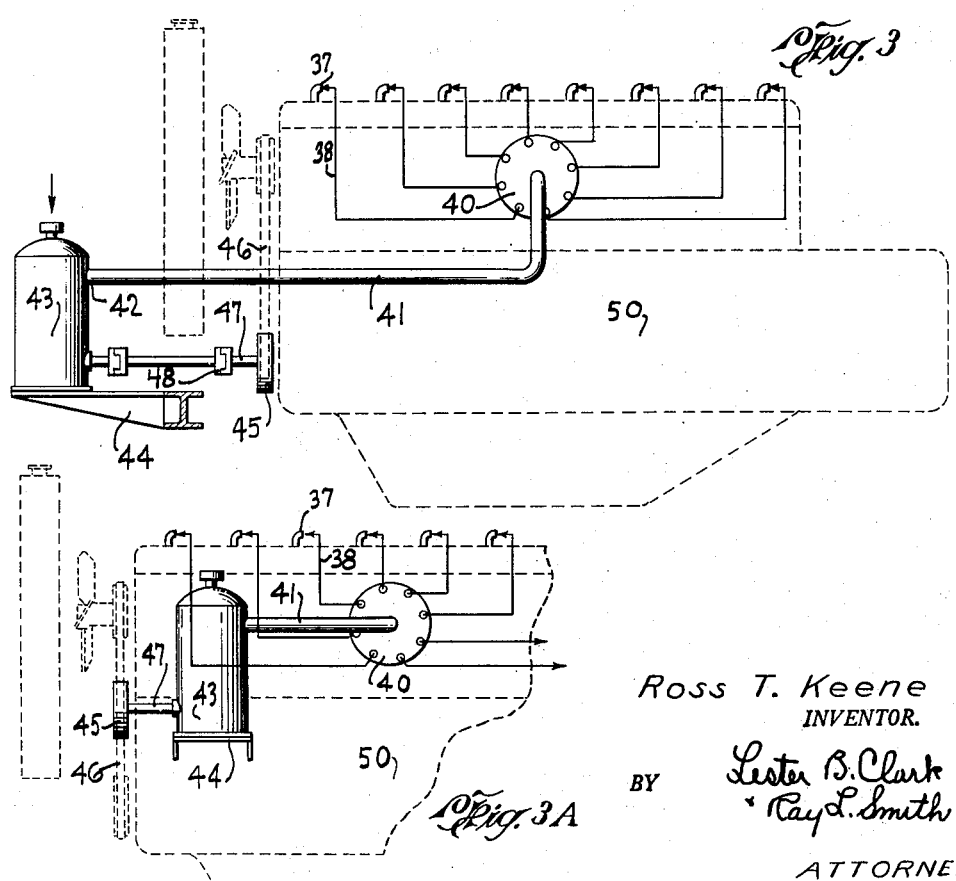
Ross T. Keene
INVENTOR.
BY Lester B. Clark
Ray L. Smith
ATTORNEYS

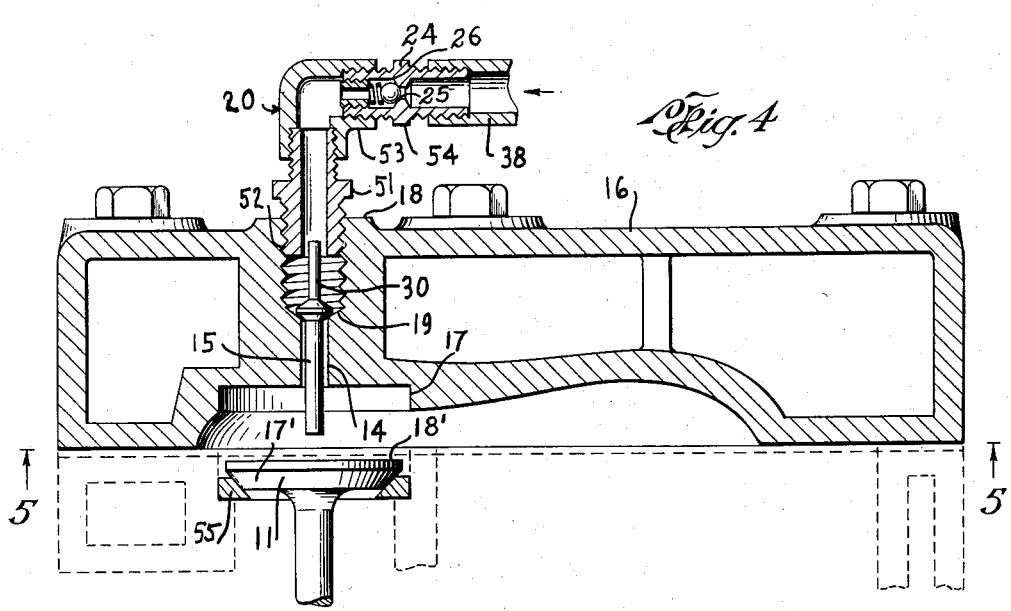
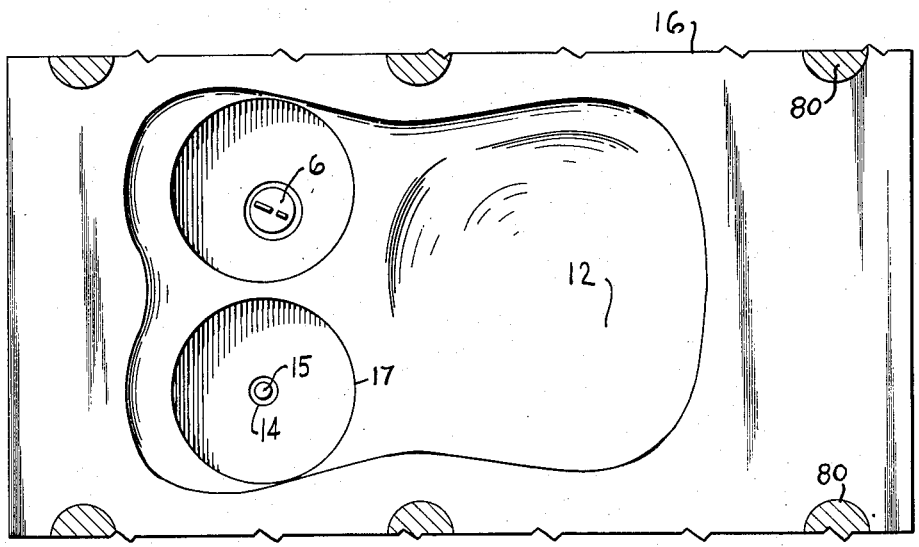

Feb. 22, 1955  R. T. KEENE  2,702,532
EXHAUST VALVE COOLING SYSTEM
Filed Aug. 26, 1950  4 Sheets-Sheet 3

Ross T. Keene
INVENTOR.

BY Lester B. Clark
Ray L. Smith
ATTORNEYS

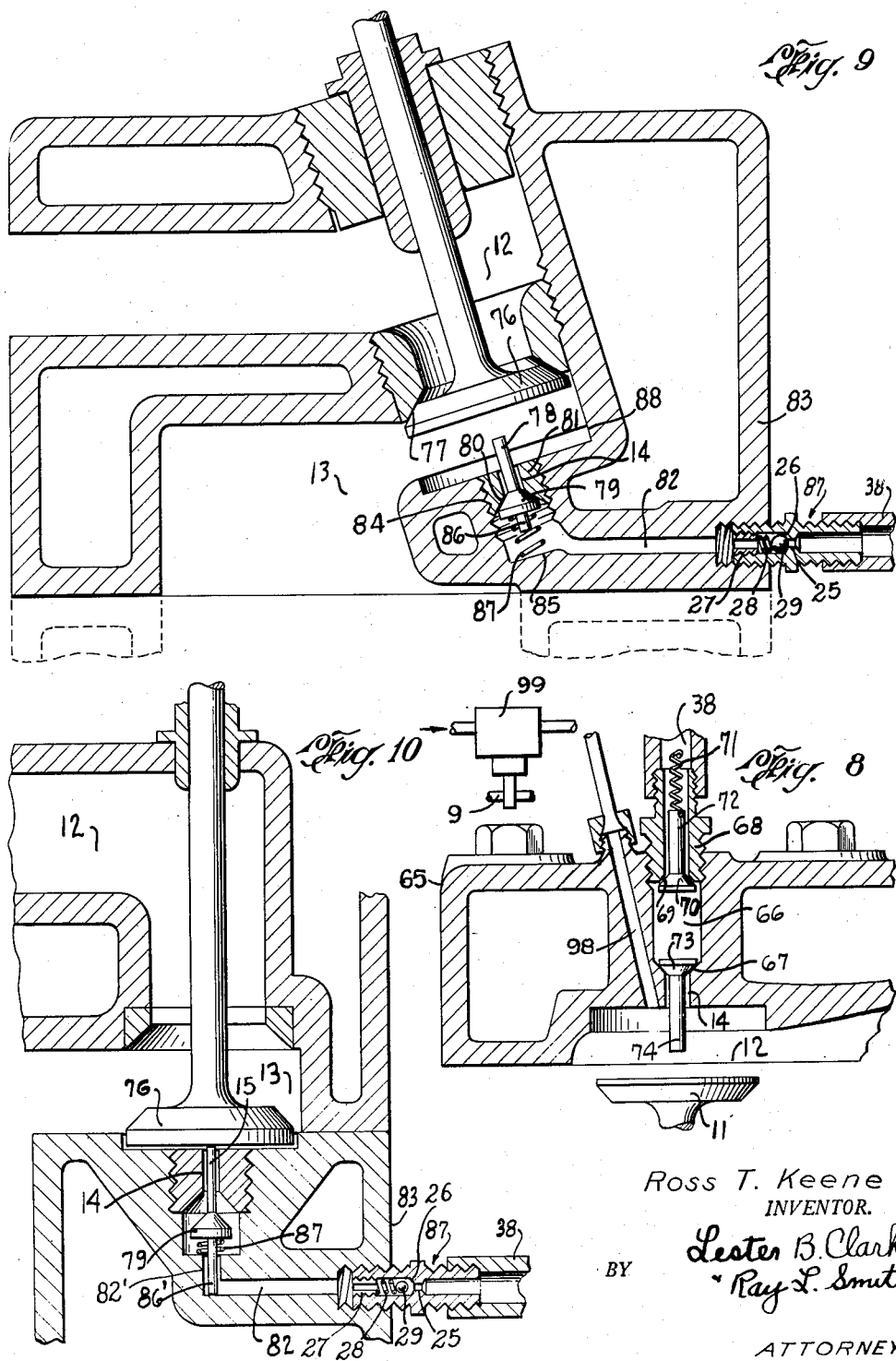

United States Patent Office 2,702,532
Patented Feb. 22, 1955

2,702,532

EXHAUST VALVE COOLING SYSTEM

Ross T. Keene, Nederland, Tex.

Application August 26, 1950, Serial No. 181,648

10 Claims. (Cl. 123—41.17)

This invention relates to an exhaust valve cooling system which is adapted to supply cool compressed air to the exhaust valves of an engine, as an internal combustion engine.

It is an object of this invention to provide an exhaust valve cooling system for engines, as internal combustion engines.

It is a further object of this invention to provide an exhaust valve system of this class operable responsive to exhaust valve motion.

It is yet another object of this invention to provide a cooling system of this class which is adapted to supply cooling air to the exhaust valves of an engine on the exhaust stroke.

It is a further object of this invention to provide a cooling system of this class which is adapted to employ the fan belt of an automobile to drive the compressor which supplies the compressed air to the cooling system.

It is yet another object of this invention to provide a cooling system of this class which has the compressor and air distributor mounted conveniently adjacent the engine to be cooled.

It is also an object of this invention to provide a cooling system of this class which has connections to the cylinder block enclosing check valves and double acting valves operable by the engine exhaust valves.

It is yet a further object of this invention to provide an exhaust valve cooling system of this class so as to obtain a higher compression ratio and a greater delivered horsepower per unit gasoline consumption.

It is a further object of this invention to provide a cooling system of this class which is adapted to cool various types of engines, as valve-in-head engines, diesel engines, and a multiplicity of types of engines.

Other and further objects will be apparent when the specification is considered in connection with the drawings in which:

Fig. 1 is a sectional view through a cylinder of an internal combustion engine at the end of the power stroke with the double acting cooling system valve in closed position;

Fig. 2 is a sectional view through a cylinder showing the piston at substantially the end of the exhaust stroke and showing the double acting cooling valve raised off its lower valve seat;

Fig. 3 is an elevation showing the system as connected to an internal combustion engine;

Fig. 3A is a modification of the system shown in Fig. 3;

Fig. 4 is an enlarged sectional view showing one form of connection to a cylinder block and the communication of the connection with the exhaust port;

Fig. 5 is a bottom view of an exhaust port, as modified to include the cooling system of this invention; such view being taken along line 5—5 of Figs. 1 and 4;

Fig. 8 is a modification in section of this invention showing a variation in valve arrangement;

Fig. 9 is a further modification in section of this system adapted to be installed on valve-in-head engines.

Fig. 10 is still a further modification in section of the installation of this invention.

Figure 6:
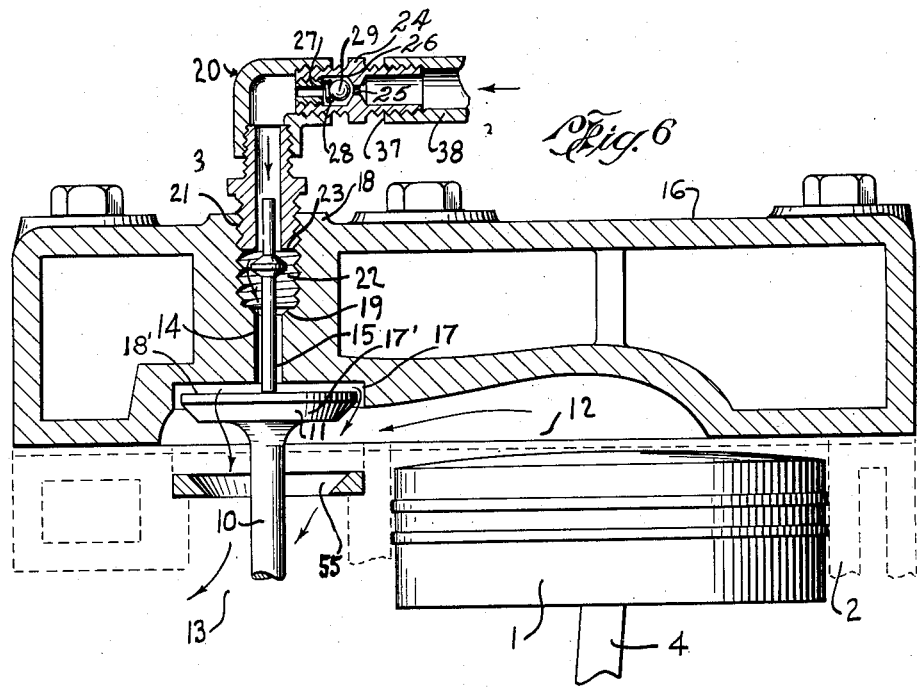
Fig. 6 is an enlarged sectional elevation showing a step in operation subsequent to the step shown in Fig. 4.

The conventional internal combustion engine has an intake stroke during which the piston 1 is moved downwardly in the cylinder 2 by the rotation of the crank shaft 3 to which the piston 1 is connected by means of the connecting rod 4.

Behind the downward motion of the piston, a fluid, as gasoline, is drawn into the cylinder. As rotation continues the piston moves upwardly to compress the fluid and at some point near the upper part of the piston's compression stroke the spark plug 6 is timed to ignite the fluid. The ignition of the fluid causes the rapid liberation of gases from the fluid and this step, called the power stroke, moves the piston 1 rapidly downward in the cylinder 2, as shown in Fig. 1.

As shown in Fig. 2 the continued rotation of the crank 3 moves the piston 1 upwardly again. At the same time the cam shaft 8 which has the cam 9 thereon, and which is synchronized with the rotation of the crank shaft, causes the cam 9 to force the stem 10 of the exhaust valve 11 upwardly to open the exhaust port 12 so that the gases of combustion may escape, as at 13. This is the conventional operation of a four cycle, internal combustion engine.

In order to cool the exhaust valve so that it does not deteriorate due to the excessive heat occurring within the exhaust port 12, ports 14 are drilled through the cylinder head block 16 to place the exhaust port 12 in communication with the cylinder head exterior and the block 16 is counterbored at 17 to form a recess into which the head 17' of the exhaust valve 11 may be received so that the exhaust gases pass therebelow and substantially out of contact with the head surface 18' of the valve 11.

Bosses 18 may be provided for the ports and each boss may be machined to provide a valve seat 19. A connection member 20 may be threaded at 21 into the cylinder head 16 to surround the valve seat 19 and the port 14 therethrough. This connection 20 is counterbored at 22 to provide a valve seat 23 and has the fitting 24 threaded on the outer end thereof. This fitting 24 is bored and counterbored at 25 and 26 respectively and the bushing 27 confines the spring 28 to retain the ball 29 seated in the valve seat at the junction of the bore 26 and counterbore 25. Outwardly of this check valve arrangement, at 37, the connection 20 is adapted for connection to a compressed air inlet conduit, which leads to an air distributor 40 as shown in Figs. 3 and 4.

On the intake stroke of the piston 1 the valve 30 seats at 19 by virtue of the suction created. This closing is abetted to an extent by the pressure of the air from the inlet conduit 39, especially as the piston 1 nears the lowest lost position of its stroke. On the compression stroke the pressure created as the piston 1 rises in the cylinder 2 raises the valve 30 and as the pressure in the cylinder rises to some figure substantially in excess of the compressed air line pressure, the valve 30 is moved outwardly to seat against the valve seat 23. Then, as the power stroke follows ignition, the valve 30 may drop downwardly toward the end of the power stroke. Finally, on the exhaust stroke, when the cam 9 raises the exhaust valve 11, this valve 11 opens the port 12 to substantially atmospheric pressure, and the compressed air pressure overcomes the spring tension against the ball 29 of the check valve and passes through the connection passage and around the valve 30 in the chamber 22 to cool the exhaust valve 11.

The air distributor 40 is connected by the supply line 41 to the discharge end 42 of the compressor 43. As shown in Fig. 3 this compressor may be mounted on a suitable bracket 44 which is part of the engine frame. The driving means may be a pulley 45 which is driven by the fan belt 46; the pulley 45 being mounted on the shaft 47 and the shaft 47 being connected from the flexible connection element 48 to drive the compressor.

As shown in Fig. 3A an optional arrangement considers a pulley 45 having a shaft 47 which is rigidly connected to drive the compressor 43. In this case the bracket 44 is mounted to the side of the engine 50 and conveniently closes to the air distributor 40.

A modified construction of the connection 20 is shown in Figs. 4 and 6. In such connection a plug 51 is threaded at 52 into the cylinder block head 16; an elbow 53 is installed thereon; and a conventional check valve construction 54 is threaded into the elbow 53. The check valve in turn has the inlet conduit 38 connected thereto. Fig. 4 shows the valve 30 seated at 19 with the stem 15 thereon extending through the port 14. Fig. 6 shows the exhaust valve 11 moved upwardly from a seat 55 to open the exhaust port 12 so that gases may pass outwardly of the engine at 55 and below the valve head 17' which at this point is recessed in, and protected by, the counterbore 17.

Figure 7:
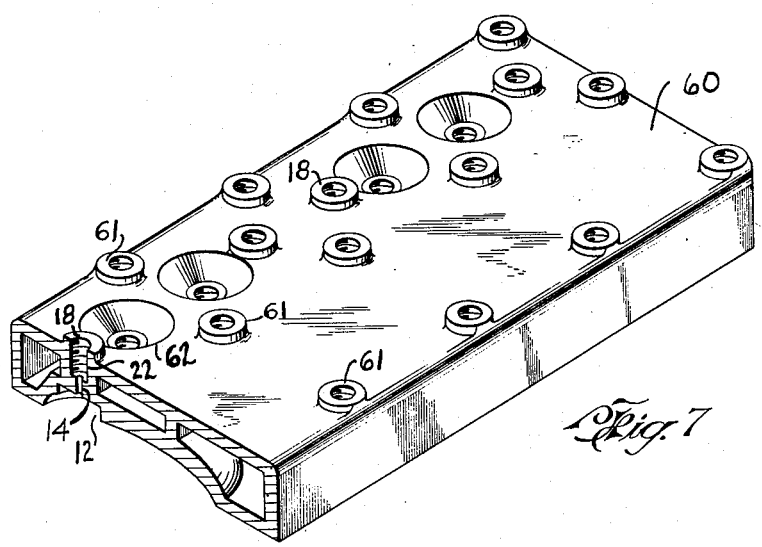
Fig. 7 is a perspective view of a cylinder head adapted to employ the cooling system of this invention.

The view of Fig. 5 shows the exhaust port 12 as viewed from below and Fig. 7 shows the cylinder head 60 as it has to be modified to receive the system of this invention. With such a cylinder head the bosses 61 on either side and down the center are to receive the bolts 80 which connect the head to the engine. The countersunk holes 62 receive the spark plugs 6, and the bosses 18 receive the cooling fluid fuel injection connections.

Figs. 8, 9 and 10, show modifications of this invention which adapt it for employment in a multiple of engine constructions, as valve-in-head engines, and other types.

In Fig. 8, the cylinder head 65 has a port 66 with the seat 67 therein, and the fitting 68, threaded into the head 65, has the countersunk end 69 which provides the seat for the check valve 70. This check valve has the spring 71 connected to the stem 72 thereof to normally hold the valve closed until the pressure in the compressed air line 38 opens the valve. The valve 73 seats in the seat 67 and is raised by pressure in the exhaust port 12, or by the exhaust valve 11 moving upwardly against its stem 74 during exhaust. The seat for the exhaust valve 11 is not shown in this figure.

In Fig. 9 the valve-in-head type construction shows the valve axis of the valve 76 operable downwardly at an angle. In this construction the exhaust port 12 opens to the atmosphere through the exhaust valve seat 77, and the valve 76 pushes against the stem 78 of the valve 79 to unseat it from the seat 80 in the bushing 81. In this construction the port 82 is drilled from the housing side 83 through to the drilled and threaded bore 84 which receives the bushing 81. The base 85 of the bore 84 provides a bearing surface for the lower end of the spring 87 which bears upwardly against the valve 79. The guide 86 maintains the spring 87 in alignment against the valve 79. The counterbore 88 is provided to receive the exhaust valve 76 at the end of the exhaust stroke.

Fig. 10 shows a similar construction to Fig. 9 with the exception that the valve guide 86' is longer than the guide 86, and the vertical port 82' is provided into which the guide 86' extends. In both Figs. 9 and 10 the check valve 87 is installed in the housing side 83, for communication with the port 82 and for connection to the compressed air line 38.

The arrangement shown whereby the compressor is driven by the fan belt is only one means by which the cooling system may be actuated. A system may be employed whereby the compressor is driven by the camshaft. With such an arrangement the double seated valve may be eliminated and replaced with a timing means actuated by the camshaft. This means will open the compressed fluid line to the passage of air against the check valve and through to the exhaust port just as the exhaust valve starts opening.

Additionally it is possible to supply added fuel against the exhaust valve on the compression stroke prior to ignition to cool the exhaust valve. This may be accomplished as shown in Fig. 8 by adding a port 98 through the cylinder head for pump injection, the timing thereof being accomplished by the camshaft 9 which drives the fuel pump 99.

Broadly, this invention considers an exhaust valve cooling system for engines in which the exhaust valve, upon opening at the beginning of exhaust, is cooled by fluid admitted into the exhaust port and against the exhaust valve. It also considers means for injection of cooling fuel against the exhaust valve during the compression stroke prior to ignition.

What is claimed is:

1. Means having a passage therethrough communicating inwardly with the exhaust port of an engine and outwardly with a pressurized cooling fluid line, a chamber in said passage having a valve seat at the inner and outer ends thereof, a first valve in said chamber having a seating portion to seat on said outer seat and a seating portion to seat on said inner seat, a stem on said first valve extending into said exhaust port, an inwardly opening check valve in said passage outwardly of said chamber, said first valve being operable responsive to engine generated pressures to seat upon said outer seat and being operable responsive to fluid line pressures to seat upon said inner seat, the exhaust valve of said engine contacting said stem upon exhaust stroke to maintain said first valve off of said inner seat as fluid line pressure opens said check valve to admit fluid through said passage to cool said exhaust valve.

2. Included with an engine cylinder head, a passage therethrough communicating outwardly with a pressurized cooling fluid line and inwardly with an exhaust port, a chamber in said passage having a valve seat at either end thereof, an inwardly opening check valve in said passage outwardly of said chamber, a double seated valve in said chamber for closing said seats and having a stem extending into said exhaust port, the exhaust valve of said engine contacting said stem on exhaust stroke to open said lower seat for passage of cooling fluid therethrough as said fluid line pressure opens said check valve.

3. With an engine having a piston, a piston cylinder having a combustion chamber with fuel inlet and ignition means connected thereinto and an exhaust port therefrom controlled by an exhaust valve whose underside seats over the port, and driving means to reciprocate the piston in said cylinder to successively draw fuel into the cylinder combustion chamber, compress the fuel, ignite the fuel and deliver power as the gases of combustion expand, and to actuate said exhaust valve to open said exhaust port to exhaust the cylinder combustion chamber, the combination of a pair of cylinder combustion chamber walls spaced apart a distance only slightly greater than the range of exhaust valve travel, one wall having the exhaust port therein and the other wall being closely approached by the top surface of the exhaust valve in port opened position, a pressurized cooling fluid delivery line connected with the cylinder combustion chamber through the last mentioned wall and arranged to direct cooling fluid toward said valve top surface, said driving means being operable to control said fluid delivery line to open said line to direct cooling fluid during the exhaust stroke against the surface of the head of said exhaust valve which is outermost during exhaust travel, and to close said line thereafter.

4. With an engine having a combustion chamber with oppositely facing walls, an exhaust port in one of said walls, an exhaust valve for said port having a range of movement which brings it into close proximity to the other wall when the valve is fully opened, a camshaft to actuate said exhaust valve to open said exhaust port for exhaust, a pressurized cooling fluid line extending through said other wall and discharging toward the valve head, and means actuated by said camshaft to open said line to admit cooling fluid into said combustion chamber and against the valve head surface opposite that which seats over the exhaust port and to close said line thereafter.

5. With an engine having a cylinder with fuel supply means and ignition means connected thereinto a piston therein, and an exhaust port therefrom controlled by an exhaust valve, and a crankshaft to reciprocate the piston in said cylinder to successively draw fuel into the cylinder, compress the fuel, deliver power as the gases of combustion expand and to exhaust said cylinder through said exhaust port, and a camshaft actuated from said crankshaft to actuate said exhaust valve to open said exhaust port for exhaust, the combination of, a pressurized cooling fluid line adapted to be placed in and out of communication with said exhaust port, a cooling fuel line from said fuel supply means adapted to be placed in and out of communication with said exhaust port, means actuated by said camshaft to open said fluid line to admit cooling fluid into said exhaust port and against said exhaust valve during exhaust stroke, and to close said fluid line thereafter, and means actuated by said camshaft to open said fuel line to admit cooling fuel into said exhaust port and against said exhaust valve during compression stroke prior to ignition and to close said fuel line thereafter.

6. In combination with an internal combustion engine having a cylinder head presenting oppositely facing spaced apart walls with an exhaust port in one of said walls and an exhaust valve controlling said exhaust port, a reentrant pocket in the other of said walls to receive the head of said exhaust valve therein upon the exhaust stroke of the engine, a passage in said cylinder head communicating inwardly with said pocket and extending outwardly through said cylinder head, a pressurized cooling fluid line communicating with the outer end of said passage and valve means controlling the flow of cooling fluid through the passage, said valve means being adapted to open responsive to the occurrence of said exhaust stroke to admit said cooling fluid into said pocket and around the head of said exhaust valve.

7. In combination with an internal combustion engine having a cylinder head with an exhaust port therein and an exhaust valve controlling said exhaust port, a passage in said cylinder head communicating inwardly with said exhaust port and extending outwardly through said cylinder head, a pressurized cooling gas line communicating with the outer end of said passage, said passage being of reduced diameter outwardly to form a valve seat within the inner portion of said passage, a check valve adapted to seat on said valve seat, and resilient means adapted to be restrained stationarily at one end with relation to said cylinder head and in contact with said check valve at the other end to urge said valve to closed position, said check valve being adapted to open responsive to the occurence of the exhaust stroke of said engine to admit said gas upon the outer surface of the head of said exhaust valve.

8. In combination with an internal combustion engine having a cylinder head with an exhaust port therein and an exhaust valve controlling said exhaust port, a passage in said cylinder head communicating inwardly with said exhaust port and extending outwardly through said cylinder head, a pressurized cooling gas line communicating with the outer end of said passage, said passage having an enlarged portion therein to form a shoulder at the inner end thereof and a valve seat at the outer end thereof, a check valve in said enlarged portion, and resilient means therein to bear at one end against said shoulder and to urge said check valve closed at the other end thereof, said check valve being adapted to open responsive to the occurrence of the exhaust stroke of said engine to admit said gas upon the outer surface of the head of said exhaust valve.

9. In combination with an internal combustion engine having a cylinder head with an exhaust port therein and an exhaust valve controlling said exhaust port, a passage in said cylinder head communicating inwardly with said exhaust port and extending outwardly through said cylinder head, a pressurized cooling gas line communicating with the outer end of said passage, said passage being of reduced diameter outwardly to form a valve adapted to seat on said valve seat, and resilient means adapted to be restrained stationarily at its outer end in the outer portion of said passage with relation to said cylinder head and connected at its inner end to said check valve to urge said check valve to closed position, said check valve being adapted to open responsive to the occurrence of the exhaust stroke of said engine to admit said gas upon the outer surface of the head of said exhaust valve.

10. In an internal combustion engine, a combustion chamber having spaced apart and facing walls, an exhaust port in one of said walls, an exhaust valve controlling said exhaust port, a recessed pocket in the other of said walls to receive the head of said exhaust valve therein upon the exhaust stroke of the engine, a pressurized cooling fluid passage communicating with said pocket, a valve seat within the passage, a check valve adapted to seat on said valve seat and to open responsive to the occurrence of the exhaust stroke of said engine to admit fluid into said pocket toward the outer surface of the valve head within said pocket.

References Cited in the file of this patent

UNITED STATES PATENTS

| Number | Name | Date |
|---|---|---|
| 713,860 | Crossley et al. | Nov. 18, 1902 |
| 1,252,501 | Sheperd | Jan. 8, 1918 |
| 1,873,119 | Griswold | Aug. 23, 1932 |
| 2,063,779 | Baj | Dec. 8, 1936 |
| 2,065,106 | Symons | Dec. 22, 1936 |
| 2,074,859 | Rich | Mar. 23, 1937 |

FOREIGN PATENTS

| Number | Country | Date |
|---|---|---|
| 195,132 | Great Britain | Mar. 15, 1923 |
| 141,968 | Switzerland | Nov. 17, 1930 |